(12) United States Patent
Goenka et al.

(10) Patent No.: US 11,714,522 B2
(45) Date of Patent: Aug. 1, 2023

(54) CONTROLLING A GRAPHICAL USER INTERFACE USING A PRESENTATION OF MESSAGES BASED UPON PREDICTED INTERACTIONS WITH THE MESSAGES

(71) Applicant: Yahoo Holdings, Inc., Sunnyvale, CA (US)

(72) Inventors: Mohit Goenka, Santa Clara, CA (US); Nikita Varma, Milpitas, CA (US); Ashish Khushal Dharamshi, Sunnyvale, CA (US)

(73) Assignee: Yahoo Assets LLC, New York, NY (US)

( * ) Notice: Subject to any disclaimer, the term of this patent is extended or adjusted under 35 U.S.C. 154(b) by 751 days.

(21) Appl. No.: 15/835,574

(22) Filed: Dec. 8, 2017

(65) Prior Publication Data
US 2019/0179493 A1    Jun. 13, 2019

(51) Int. Cl.
| | |
|---|---|
| G06F 3/00 | (2006.01) |
| G06F 3/0482 | (2013.01) |
| H04L 67/306 | (2022.01) |
| G06F 9/451 | (2018.01) |
| H04L 51/42 | (2022.01) |
| H04L 51/224 | (2022.01) |
| H04L 67/50 | (2022.01) |
| H04L 67/01 | (2022.01) |

(52) U.S. Cl.
CPC ............ *G06F 3/0482* (2013.01); *G06F 9/451* (2018.02); *H04L 51/224* (2022.05); *H04L 51/42* (2022.05); *H04L 67/306* (2013.01); *H04L 67/535* (2022.05); *H04L 67/01* (2022.05)

(58) Field of Classification Search
CPC ....... G06F 3/0482; G06F 9/451; H04L 51/22; H04L 51/24; H04L 67/22; H04L 67/306; H04L 67/42; H04L 51/42; H04L 51/224; H04L 67/535; H04L 67/01
See application file for complete search history.

(56) References Cited

U.S. PATENT DOCUMENTS

| | | | |
|---|---|---|---|
| 7,523,401 B1 * | 4/2009 | Aldridge | G06F 16/958 715/760 |
| 7,882,434 B2 * | 2/2011 | Slotznick | G09B 7/00 715/710 |

(Continued)

*Primary Examiner* — Kieu D Vu
*Assistant Examiner* — Andrew Chung
(74) *Attorney, Agent, or Firm* — Cooper Legal Group LLC

(57) ABSTRACT

One or more computing devices, systems, and/or methods for controlling a graphical user interface using a presentation of messages based upon predicted interactions with the messages are provided. For example, a plurality of messages associated with the messaging account may be received. Interactions with the plurality of messages may be tracked to generate sets of message interactions. The plurality of messages may be analyzed to identify sets of attributes. An expected action model may be generated based upon the sets of message interactions and the sets of attributes. A set of messages associated with the messaging account may be analyzed based upon the expected action model to predict one or more interactions corresponding to one or more potential presentations of the set of messages. A presentation may be selected from the one or more potential presentations. A graphical user interface may be controlled using the presentation.

20 Claims, 13 Drawing Sheets

(56) References Cited

U.S. PATENT DOCUMENTS

| | | | |
|---|---|---|---|
| 10,079,903 B1* | 9/2018 | Cunico | H04L 67/22 |
| 10,445,381 B1* | 10/2019 | Gharmalkar | H04L 51/22 |
| 2006/0090142 A1* | 4/2006 | Glasgow | G06F 3/0482 |
| | | | 715/780 |
| 2008/0126951 A1* | 5/2008 | Sood | G06Q 10/107 |
| | | | 715/752 |
| 2012/0233556 A1* | 9/2012 | Meyers | H04M 3/53333 |
| | | | 715/752 |
| 2012/0290662 A1* | 11/2012 | Weber | G06Q 10/107 |
| | | | 709/206 |
| 2013/0290879 A1* | 10/2013 | Greisson | H04M 1/72522 |
| | | | 715/764 |
| 2015/0281155 A1* | 10/2015 | Cue | G06F 3/04883 |
| | | | 715/752 |
| 2016/0328097 A1* | 11/2016 | Gan | H04L 51/22 |
| 2016/0352664 A1* | 12/2016 | Braines | G06F 3/04842 |
| 2016/0381092 A1* | 12/2016 | Dash | H04L 67/306 |
| | | | 715/752 |
| 2017/0017352 A1* | 1/2017 | Kanter | G06F 3/0485 |
| 2017/0026328 A1* | 1/2017 | Adkins | H04L 51/16 |
| 2017/0054670 A1* | 2/2017 | Lee | H04L 51/12 |
| 2017/0094484 A1* | 3/2017 | Li | H04H 60/52 |
| 2017/0140285 A1* | 5/2017 | Dotan-Cohen | G06Q 10/04 |
| 2017/0149913 A1* | 5/2017 | Olomskiy | H04L 67/2842 |
| 2017/0228107 A1* | 8/2017 | Bhati | G06F 3/0482 |
| 2017/0242552 A1* | 8/2017 | Kirov | H04W 68/005 |
| 2018/0013698 A1* | 1/2018 | Vendrow | H04L 67/327 |
| 2018/0020078 A1* | 1/2018 | Lautenberg | H04L 51/14 |
| 2018/0048595 A1* | 2/2018 | Dotan-Cohen | H04L 51/08 |
| 2018/0096399 A1* | 4/2018 | Delayen | G06F 40/14 |
| 2018/0188906 A1* | 7/2018 | Carter | G06F 3/0482 |
| 2018/0219817 A1* | 8/2018 | Zang | H04L 51/04 |
| 2018/0248829 A1* | 8/2018 | Hardee | H04L 51/24 |
| 2019/0028421 A1* | 1/2019 | Duchastel | G10L 13/04 |
| 2019/0158610 A1* | 5/2019 | Holzband | H04L 67/22 |
| 2020/0007488 A1* | 1/2020 | Mao | H04W 68/005 |

\* cited by examiner

500

WELCOME TO YOUR INBOX — 1005

1010 — 1015 — 1020 —

| Sender | Subject | Date Rec. |
|---|---|---|
| News | This week's headlines | 11/24/2017 |
| James | What's new buddy | 11/23/2017 |
| Manager | Project due next week | 11/22/2017 |
| Senator | Thank you for calling my office | 11/21/2017 |
| Electronics Store | Check out our Thanksgiving sale | 11/20/2017 |
| School | Events on campus | 11/19/2017 |
| Wife | Pick up groceries | 11/18/2017 |
| Landlord | Confirmation of Rent payment | 11/17/2017 |

FIG. 10

CONTROLLING A GRAPHICAL USER INTERFACE USING A PRESENTATION OF MESSAGES BASED UPON PREDICTED INTERACTIONS WITH THE MESSAGES

BACKGROUND

Many services, such as instant messaging services, email services, social networks and/or apps may allow a user to create an account capable of sending and receiving messages, such as an email account. The account may be presented via a graphical user interface, which may be used by the user to view, determine a significance of and/or act upon received messages. For example, the user may read, archive, delete, ignore, reply to, and/or forward a received message.

SUMMARY

In accordance with the present disclosure, one or more computing devices and/or methods for controlling a graphical user interface using a presentation of messages based upon predicted interactions with the messages are provided. In an example, a plurality of messages comprising a first message and a second message, associated with a messaging account, may be received. Interactions with the plurality of messages may be tracked to generate a first set of message interactions for the first message and a second set of message interactions for the second message. The plurality of messages may be analyzed to identify a first set of attributes for the first message and a second set of attributes for the second message. An expected action model may be generated based upon the first set of message interactions, the second set of message interactions, the first set of attributes and/or the second set of attributes. A set of messages associated with the messaging account may be analyzed based upon the expected action model to predict one or more interactions corresponding to one or more potential presentations of the set of messages. A presentation may be selected from the one or more potential presentations. A graphical user interface may be controlled using the presentation.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 10 is a component block diagram illustrating an example system for controlling a graphical user interface using a presentation of messages based upon predicted interactions with the messages.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
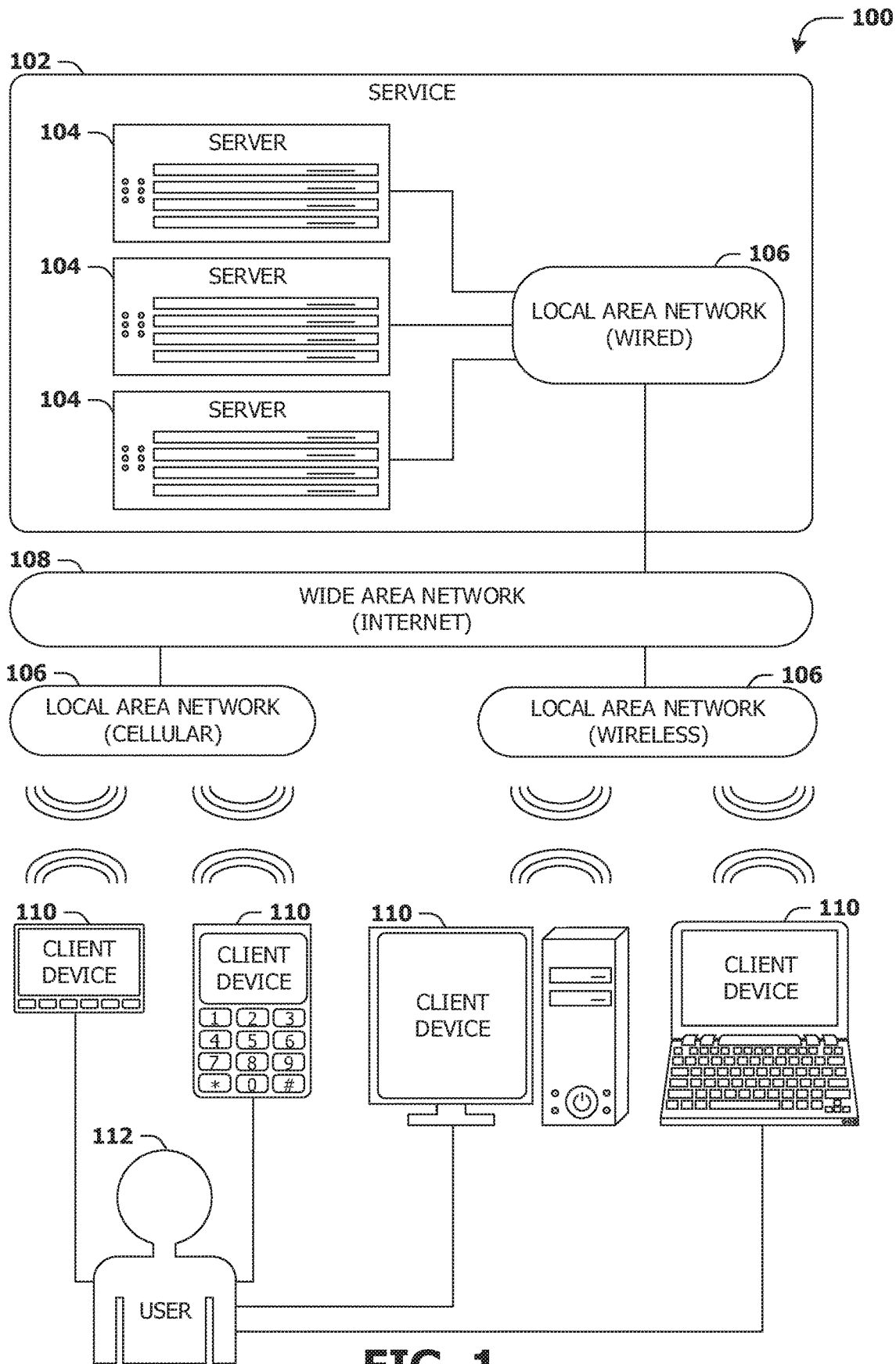
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
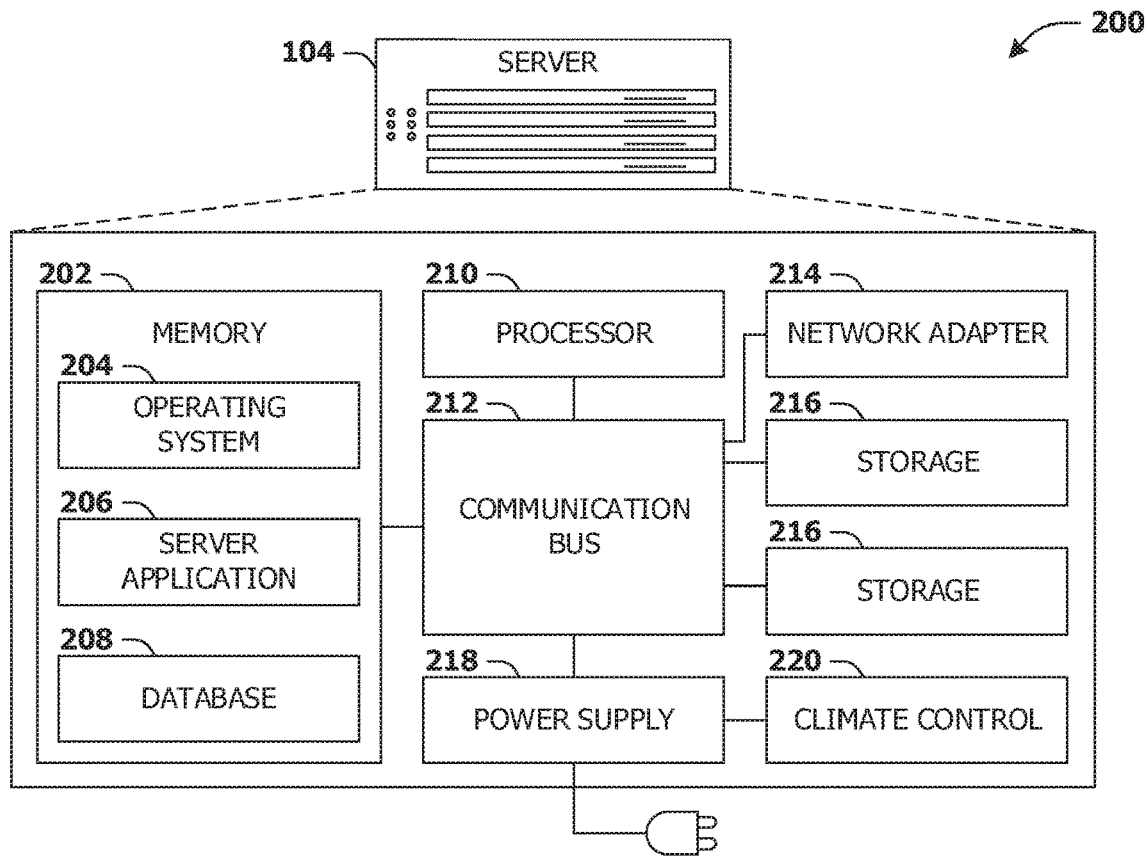
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
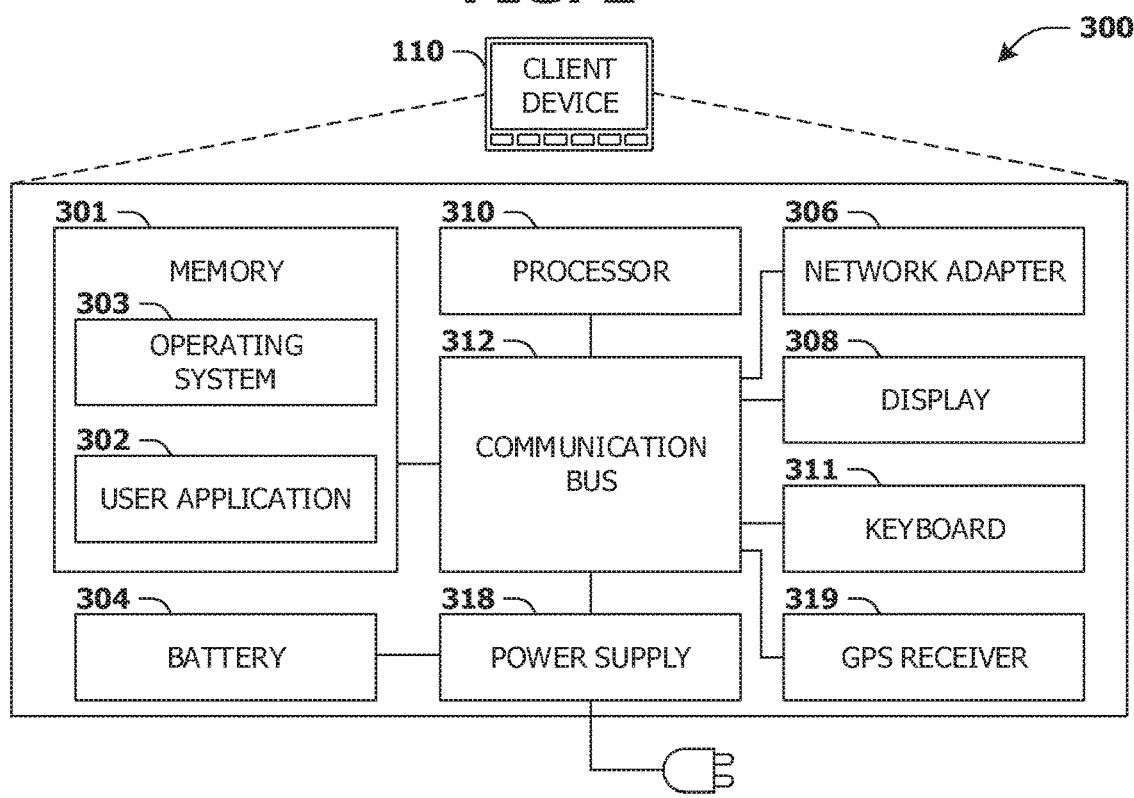
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for controlling a graphical user interface using a presentation of messages based upon predicted interactions with the messages are provided. For example, a user may have a messaging account (e.g., such as an email account, an instant messaging account, a social network account, a phone call account, a fax account, a video call account, etc.). A plurality of messages (e.g., email messages, instant messages, social network messages/posts, (e.g., logs and/or transcripts of) phone calls, faxes, video calls, etc.), associated with the messaging account, may be received (e.g., by a server and/or a client device of the user). The user may want to view and/or interact with (e.g., reply, forward, etc.) the plurality of messages via one or more interfaces on the client device (e.g., such as an email client, a browser, an app, or another interface on the client device).

Viewing (e.g., and/or reading) (e.g., each of) the plurality of messages (e.g., and/or information about the messages), determining a significance of (e.g., each of) the plurality of messages and/or acting upon (e.g., each of) the plurality of messages may requiring selecting each message from a list/folder of messages, interacting with each message, returning to the list/folder of messages, and then proceeding to a next message, and thus may consume a significant amount of time and/or resources of the client device. Additionally, a user may have more interest, use, ability, etc. to process some messages rather than others in association with a context. For example, the user may desire to view and/or reply to work emails during daytime on weekdays (e.g., and/or be capable of processing more work emails during these times than other types of emails) while desiring to view and/or interact with personal emails during evenings and weekends (e.g., and/or be capable of processing more personal emails during these times than other types of emails), but in conventional systems, the messages may simply be presented based upon a date the messages are received. Thus, the emails best suited for processing (e.g., most efficiently) may be listed low in a list of messages (e.g., inbox). Thus, over time, in conventional systems, the message that the user desires and/or is best situated to view and/or interact with to may not be visually accessible, and the client device may be required to use an excessive amount of hardware resources (e.g., processor power) to retrieve the message, such as processing input for a search for the message, scanning a database of messages, identifying the message as matching the search, and presenting the message for further interaction. Alternatively and/or additionally, resources of the client device may be occupied with presenting the user with other messages/functions, and the client device may thus cause the user to forget and/or otherwise fail to satisfy the intention to interact with the message in conventional systems.

Thus, in accordance with one or more of the techniques presented herein, interactions with the plurality of messages and sets of attributes of the plurality of messages may be used to generate an expected action model, which may be used to predict one or more interactions corresponding to one or more potential presentations of a set of messages, and a graphical user interface may be controlled based upon a presentation selected from the one or more potential presentations. For example, the graphical user interface may be controlled in a manner that distinguishes the messages that the user intends and/or is best and/or better suited to interact with (e.g., reply, forward, etc.), in a particular context (e.g., a current time) associated with the user, from one or more other messages. Thus, in accordance with one or more of the techniques presented herein, the desired interactions may be performed with greater speed (e.g., as the client device graphically presents the messages associated with the desired interactions in an accessible manner at a desirable time) and improved accuracy (e.g., as the client device decreases the probability of the desired interactions with messages being forgotten). Accordingly, the controlling of the graphical user interface (e.g., and/or one or more other actions) described herein improves the speed, accuracy and usability of computer displays and/or computer devices.

Figure 4:
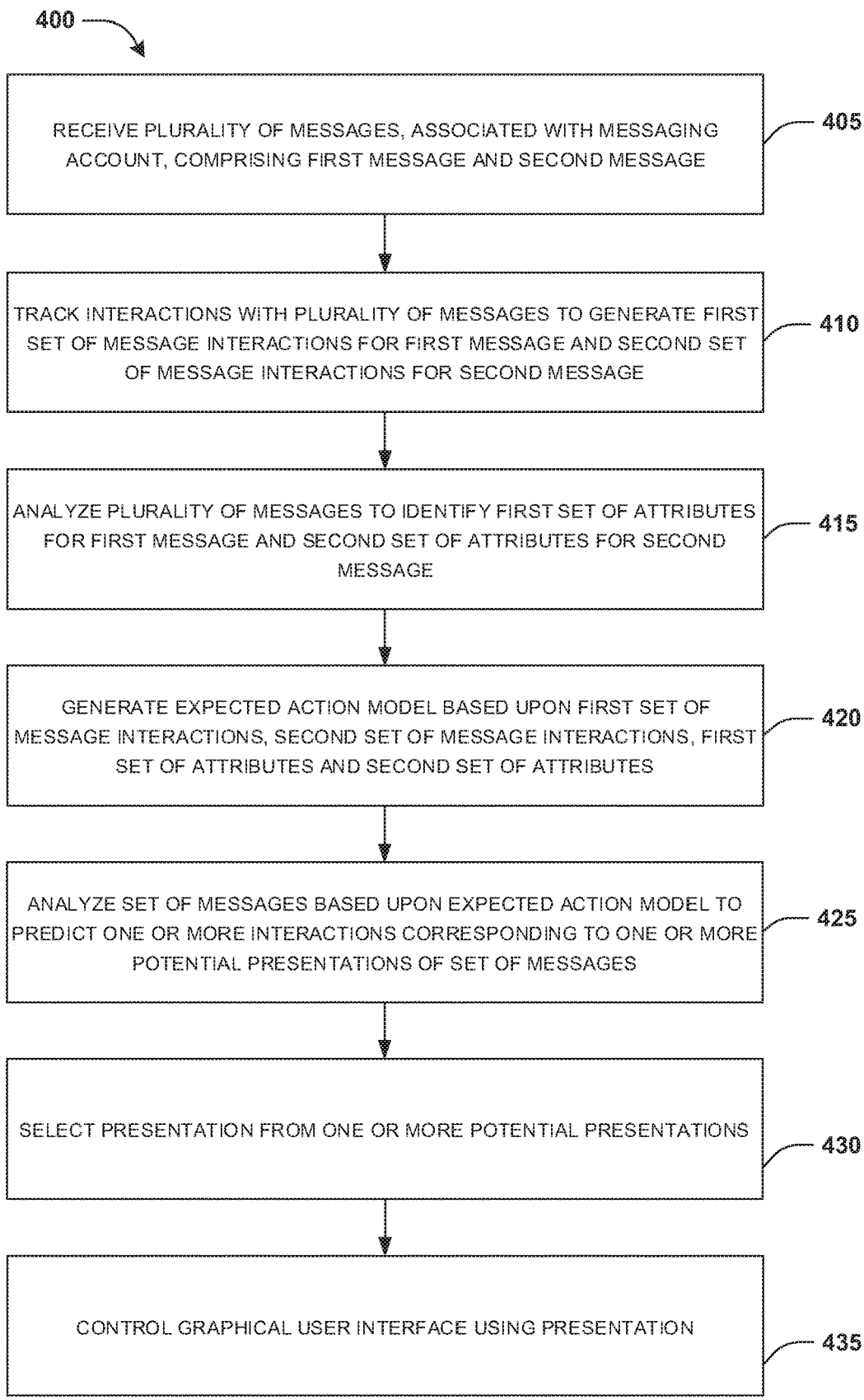
FIG. 4 is a flow chart illustrating an example method for controlling a graphical user interface using a presentation of messages based upon predicted interactions with the messages.

An embodiment of controlling a graphical user interface using a presentation of messages based upon predicted interactions with the messages is illustrated by an example method 400 of FIG. 4. In some examples, the messaging account may comprise an email account. A user, such as user Jill, (e.g., and/or a client device) may access and/or interact with a service for sending and receiving messages, such as an email service, an instant messaging service, a social network, an app, etc. The messaging account of the user with the service may be accessed and/or interacted with via one or more interfaces on the client device, such as an email client, a browser, an app, or another interface on the client device. Accordingly, at 405, a plurality of messages comprising a first message and a second message, associated with the messaging account, may be received (e.g., by a server and/or the client device) (e.g., via an email client, via a browser, via an app, via a social network, via an instant messaging service, via a phone call service, via a video call service, via a fax service, etc.). The plurality of messages may be stored in one or more databases for the messaging account, such as a first database for an inbox (e.g., and/or log of incoming communications) of the messaging account, a second database for a sent box (e.g., and/or log of outgoing communications) of the messaging account, etc.

At 410, interactions with each message of the plurality of messages may be tracked (e.g., by the server and/or the client device) to generate a set of message interactions for each message of the plurality of messages. For example, interactions with the first message may be tracked to generate a first set of message interactions for the first message and/or interactions with the second message may be tracked to generate a second set of message interactions for the second message. Interactions may include opening a message, replying to a message, forwarding a message, sharing a message (e.g., via a social media feed, a blog, etc.), ignoring a message, not opening a message (e.g., even after a portion of the message is displayed), deleting a message, marking a message as spam, associating a message with a label and/or folder, etc.

At 415, the plurality of messages may be analyzed (e.g., scanned) to identify a set of attributes for each message of the plurality of messages. For example, the first message may be analyzed to identify (e.g., and/or extract) a first set of attributes for the first message and/or the second message may be analyzed to identify (e.g., and/or extract) a second set of attributes for the second message. Attributes identified for a message may include content and/or metadata of the message, such as a sender (e.g., name, address, username, etc.) of a message, a recipient (e.g., name, address, username, etc.) of a message, a subject of a message, a body of a message, a time of an interaction (e.g., opening, replying, forwarding, sharing, ignoring, not opening, deleting, marking as spam, associating with label/folder, etc.) with a message, a time of receipt of a message, portions of a header of a message, a topic/category determined to be associated with a message, and/or a domain associated with (e.g., a sender, a recipient, a reply-to address, etc. of) a message.

At 420, an expected action model may be generated based upon the set of message interactions for each message of the plurality of messages and the set of attributes for each message of the plurality of messages. For example, the expected action model may be generated based upon the first set of message interactions for the first message, the second set of message interactions for the second message, the first set of attributes for the first message and/or the second set of attributes for the second message. The expected action model may indicate probabilities and/or correlations between one or more attributes of messages and/or one or more interactions. For example, the expected action model may indicate that messages with a first attribute tend to be replied to within a first amount of time, while messages with a second attribute tend to be forwarded within a second amount of time, and while messages with a third attribute tend to be ignored. Alternatively and/or additionally, the expected action model may indicate that messages with a first attribute tend to be read and/or interacted with at certain times (e.g., daytime) and/or locations (e.g., office), while messages with a second attribute tend to be read and/or interacted with at other times (e.g., evenings) and/or locations (e.g., home).

In some examples, the expected action model may be customized for a (e.g., single) user and/or messaging account, while in other examples, the expected action model may be global and/or used for a plurality of users. In some examples, the expected action model may be customized for a particular set of users, such as employees of a company, while in other examples, the expected action model may be further customized for subsets of the set of users, such as engineers at the company. In some examples, the expected action model used for a user may be combination of a user-specific expectation model generated for the user's messaging account and one or more global expectation models generated for a plurality of users, a set of users, a subset, etc.

At 425, a set of messages (e.g., of the plurality of messages) associated with the messaging account (e.g., stored in one or more databases (e.g., inbox) for the messaging account) may be analyzed based upon the expected action model to predict one or more interactions corresponding to one or more potential presentations of the set of messages. For example, the set of messages may include a plurality of (e.g., recently) dated (e.g., most recent) messages. Interactions (e.g., by the user) may be predicted to occur with the set of messages for various potential presentations. For example, a first set of interactions may be predicted to occur if the set of messages is presented from most recent to least recent and/or in a first context of the client device and/or user, a second set of interactions may be predicted to occur if the set of messages is presented from least recent to most recent and/or in a second context of the client device and/or user, a third set of interactions may be predicted to occur if a first group (e.g., corresponding to a topic, category, etc.) of the set of messages is presented above a second group of the set of messages and/or in a third context of the client device and/or user, a fourth set of interactions may be predicted to occur if the second group of the set of messages is presented above the first group of the set of messages and/or in fourth first context of the client device and/or user, etc. It may be the appreciated that one or more of the first context, the second context, the third context and/or the fourth context may be the same and/or different than the others.

At 430, a presentation may be selected from the one or more potential presentations. The presentation may be selected in response to receiving a request to access the set of messages (e.g., a request to access an inbox or other folder). The selection of the presentation from amongst the one or more potential presentations may be performed based upon a context determined based upon the request. The context may correspond to a location of the client device and/or user, a (e.g., period of) time (e.g., hour, day, month, year, season, weekday vs weekend, holiday) associated with the request, a time zone of the client device and/or user, etc. It may be appreciated that in some examples, the presentation may be generated without generating other potential presentations, and may thus be selected by default.

It may be appreciated that relevant periods of time may be determined, identified and/or defined in a database based upon an analysis of the plurality of messages to identify clusters of interactions with messages by the user. For example, a first cluster of interactions with travel-related messages may be identified on weekends, a second cluster of interactions with entertainment-related messages may be identified between 7 pm and 10 pm, etc.

At 435, a graphical user interface may be controlled using the presentation selected from the one or more potential presentations. For example, the graphical user interface may be controlled to display one or more portions of one or more messages of the set of messages in accordance with a layout, an order and/or a setting of (e.g., defined by) the presentation. The controlling of the graphical user interface may cause a computer display of the client device (e.g., and/or one or more other client devices) to highlight the messages predicted to be more relevant and/or attract more interaction based upon the context, such that the highlighted messages are visually distinguished (e.g., by order, by font, by size, by formatting, etc.) from one or more other messages (e.g., that are predicted to be less relevant and/or attract less interaction based upon the context). Thus, the controlling the graphical user interface enables the desired and/or suitable messages to be accessed and/or interacted with at a greater speed and improved accuracy, as well as the processing of a maximum number and/or amount of messages, and thereby improves the speed, accuracy and usability of computer displays and/or computer devices.

In some examples, the set of messages may include a third message and a fourth message, and the potential presentations may correspond to potential ordered arrangements of the set of messages. The expected action model may predict a first set of interactions (e.g., high level of interaction with the third message and medium level of interaction with the fourth message) expected to occur if the third message is presented in a first position in accordance with a first ordered arrangement of a first potential presentation and the fourth message is presented in a second position (e.g., different than (e.g., below) the first position) in accordance with the first ordered arrangement of the first potential presentation.

The expected action model may predict a second set of interactions (e.g., low level of interaction with the third message and no level of interaction with the fourth message) expected to occur if the third message is presented in the second position in accordance with a second ordered arrangement of a second potential presentation and the fourth message is presented in the first position in accordance with the second ordered arrangement of the second potential presentation. A comparison of the first set of interactions with the second set of interactions (e.g., and/or one or more other sets of interactions predicted based upon other ordered arrangements and/or potential presentations) may be performed, and the first potential presentation may be selected (e.g., responsive to determining that it is associated with a highest level of interaction overall, a highest proportion of messages interacted with, etc.). The controlling the graphical user interface may comprise presenting the third message in the first position and/or presenting the fourth message in the second position (e.g., in accordance with the first ordered arrangement of the first potential presentation).

In some examples, the set of messages may include the third message and the fourth message, and the potential presentations may correspond to potential notification settings for the set of messages. The, an interaction with the third message and medium level of interaction with the fourth message) expected to occur if a notification for the third message is presented at a first notification time in accordance with a first notification setting of the first potential presentation and a notification for the fourth message is presented at a second notification time (e.g., the same as or different than (e.g., before or after) the first notification time) in accordance with the first notification setting of the first potential presentation.

A notification may be a push (e.g., from a server) and/or local (e.g., on a client device) alert that may be presented on the client device, and may include at least some of and/or a summary of the corresponding message(s). The notification may come in one or more forms (e.g., corresponding to one or more different statuses of the client device), such as a banner which may be temporary and/or persistent (e.g., on top and/or on bottom of screen), a badge (e.g., on an icon), an audio alert, etc.

The expected action model may predict a second set of interactions (e.g., low level of interaction with the third message and no level of interaction with the fourth message) expected to occur if the notification for the third message is presented at the second notification time in accordance with a second notification setting of the second potential presentation and the notification for the fourth message is presented at the first notification time in accordance with the second notification setting of the second potential presentation. A comparison of the first set of interactions with the second set of interactions (e.g., and/or one or more other sets of interactions predicted based upon other potential presentations) may be performed, and the first potential presentation may be selected (e.g., responsive to determining that it is associated with a highest level of interaction overall, a highest proportion of messages interacted with, etc.). The controlling the graphical user interface may comprise presenting the notification for the third message at the first notification time and/or presenting the notification for the fourth message at the second notification time (e.g., in accordance with the first notification setting of the first potential presentation).

In some examples, the set of messages may include a first bundle of messages (e.g., associated with a common topic, type, theme, sender, etc.), and the potential presentations may correspond to potential bundle notification settings for the first bundle and/or the set of messages. The expected action model may predict a first set of interactions (e.g., high level of interaction with the first bundle) expected to occur with the first bundle of messages by a first time threshold. For example, a prediction may be made that work-related emails will be accessed and/or interacted with by 11 am. In response to determining that the first bundle of messages (e.g., the work-related emails) have not been interacted with (e.g., at the high level) by the first time threshold, the selecting of the presentation may be performed. The controlling the graphical user interface may comprise presenting a notification for the first bundle of messages (e.g., at a second time determined using the expected action model and/or upon or after the first time threshold). For example, a notification indicating that the first bundle of messages (e.g., work-related emails) is available (e.g., for reading, interacting with, etc.) may be presented (e.g., at 11:15 am).

In some examples, the set of messages may include the third message and the fourth message, and the potential presentations may correspond to potential delivery settings for the set of messages. The expected action model may predict a first set of interactions (e.g., high level of interaction with the third message and medium level of interaction with the fourth message) expected to occur if the third message is delivered at a first delivery time (e.g., the same as or after the original and/or attempted delivery time of the third message) in accordance with a first delivery setting of the first potential presentation and the fourth message is delivered at a second delivery time (e.g., the same as or after the original and/or attempted delivery time of the fourth message) (e.g., different than (e.g., before or after) or the same as the first delivery time) in accordance with the first delivery setting of the first potential presentation.

The expected action model may predict a second set of interactions (e.g., low level of interaction with the third message and no level of interaction with the fourth message) expected to occur if the third message is delivered at the second delivery time in accordance with a second delivery setting of the second potential presentation and the fourth message is delivered at the first delivery time in accordance with the second delivery setting of the second potential presentation. A comparison of the first set of interactions with the second set of interactions (e.g., and/or one or more other sets of interactions predicted based upon other potential presentations) may be performed, and the first potential presentation may be selected (e.g., responsive to determining that it is associated with a highest level of interaction overall, a highest proportion of messages interacted with, etc.). Delivery of the third message may be delayed until the first delivery time and/or delivery of the fourth message may be delayed until the second delivery time (e.g., in accordance with the first delivery setting of the first potential presentation).

The delaying may be performed by a recipient of the third message and/or fourth message (e.g., such that a sender has successfully transmitted the third message and/or the fourth message but the recipient has not processed and/or presented the third message and/or the fourth message). Alternatively and/or additionally, the delaying may be performed by a sender and/or author of the third message and/or fourth message (e.g., such that the sender has not successfully transmitted the third message and/or the fourth message).

In some examples, the third message may be delivered to a mailbox (e.g., and/or other database) at the first delivery time and/or the fourth message may be delivered to the mailbox (e.g., and/or other database) at the second delivery time. While the third message is delayed from delivery to the mailbox, the third message may be delivered and/or represented in a secondary mailbox of the messaging account (e.g., prior to and/or until the first delivery time). While the fourth message is delayed from delivery to the mailbox, the fourth message may be delivered and/or represented in the secondary mailbox of the messaging account (e.g., prior to and/or until the second delivery time).

The mailbox may be a default and/or primary representation of the messaging account and/or the secondary mailbox may be a supplementary and/or secondary representation of the messaging account. For example, the mailbox may be optimized using the expected action model to present the messages predicted to result in the most interactions, and may thus not include at least some messages associated with the messaging account, while the secondary mailbox may include more and/or all messages associated with the messaging account.

In some examples, upon selecting the first potential presentation (e.g., responsive to determining that it is associated with a highest level of interaction overall, a highest proportion of messages interacted with, etc.), a feedback message may be generated and transmitted to a sender of the third message and/or the fourth message. The feedback message may indicate the notification time and/or delivery time associated with the third message and/or the fourth message. For example, the feedback message may suggest modifying (e.g., future) message delivery times based upon the notification time and/or the delivery time. Alternatively and/or additionally, the feedback message may include instructions (e.g., computer-executable code) that when delivered to the sender, causes the sender to modify one or more rules and/or causes future message delivery times to be changed based upon the notification time and/or the delivery time. It may be appreciated that the feedback message may be generated base upon data of one messaging account, a set of messaging accounts (e.g., associated with a company, etc.) and/or many or all messaging accounts (e.g., global data).

In some examples, the expected action model may be continuously improved and/or updated based upon messages received and/or sent by the messaging account and/or interactions with the messages. For example, a new set of messages may be received in association with the messaging account. Interactions with the new set of messages may be tracked to generate a set of message interactions for each message of the new set of messages. The new set of messages may be analyzed to identify a set of attributes for each message of the new set of messages. The expected action model may be modified based upon the sets of message interactions generated for the new set of messages and the sets of attributes identified for the new set of messages.

In some examples, the user (e.g., or a manager, administrator, etc.) may want to access a visualization of one or more interactions predicted for the messaging account (e.g., and/or one or more assumptions, correlations, etc. of the expected action model). A request for a list of interactions predicted for the messaging account (e.g., and/or the one or more assumptions, correlations, etc.) may be received via the client device (e.g., and/or another client device). Based upon the request, an interactions data structure comprising the list of interactions (e.g., and/or the one or more assumptions, correlations, etc.) may be generated. The graphical user interface may be controlled using the interactions data structure. For example, the controlling the graphical user interface may cause the computer display to graphically present the list of interactions (e.g., and/or the one or more assumptions, correlations, etc.) and/or distinguish the list of interactions from one or more other graphical objects.

Figure 5:
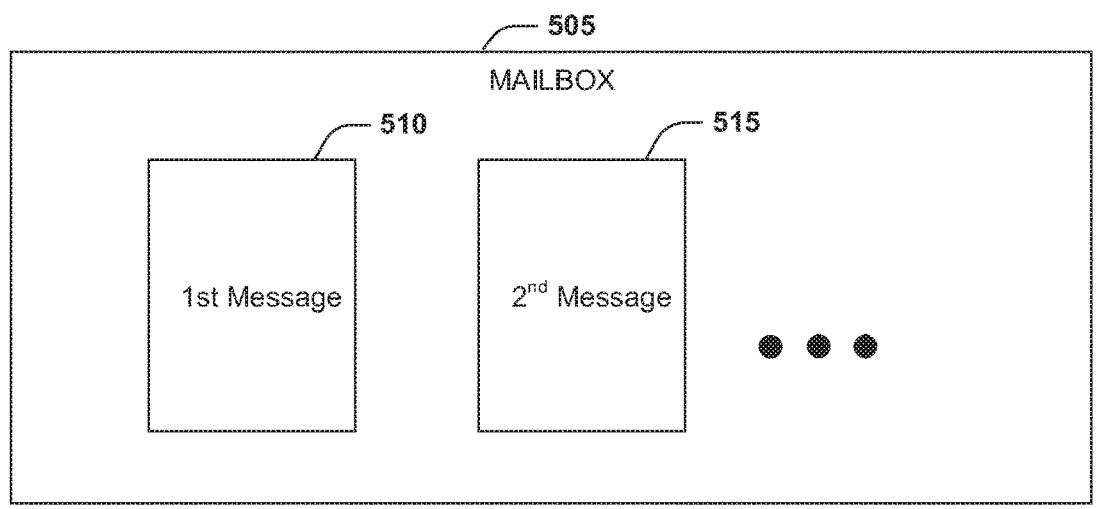
FIG. 5 is a component block diagram illustrating an example system for controlling a graphical user interface using a presentation of messages based upon predicted interactions with the messages.
Figure 6:
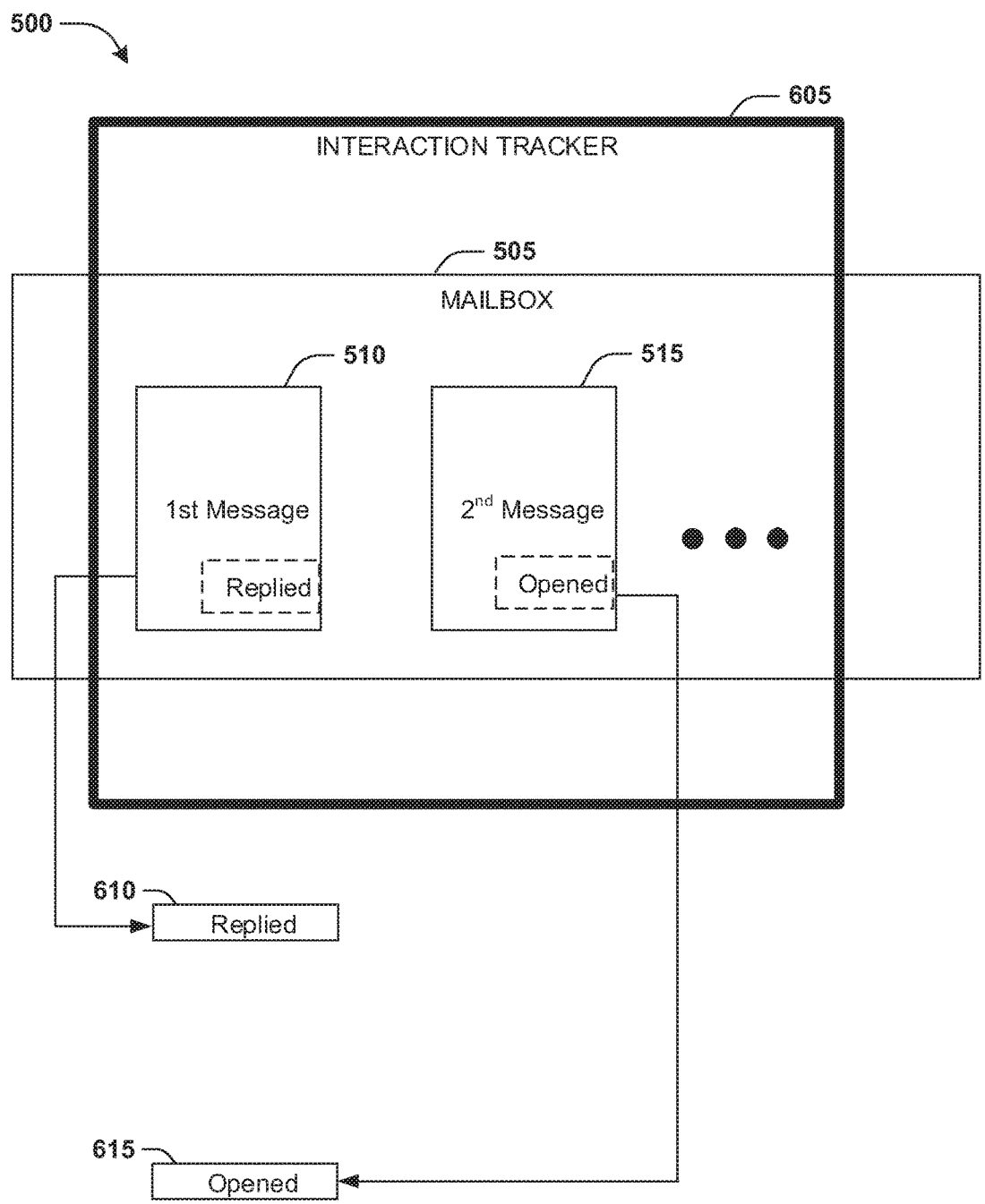
FIG. 6 is a component block diagram illustrating an example system for controlling a graphical user interface using a presentation of messages based upon predicted interactions with the messages.

FIG. 5 illustrates a system 500 for controlling a graphical user interface using a presentation of messages based upon predicted interactions with the messages. The system 500 may receive a first message 510, a second message 515, and/or one or more other messages in a mailbox 505. As illustrated in FIG. 6, the system 500 may include an interaction tracker 605, which may be configured to track interactions with messages in the mailbox 505 and generate a set of message interactions for each message in the mailbox 505. The interaction tracker 605 may track the first message 510 to determine that the first message 510 was replied to, and may generate a first message interaction 610 indicating the reply. The interaction tracker 605 may track the second message 515 to determine that the second message 515 was opened, and may generate a second message interaction 615 indicating the opening.

Figure 7:
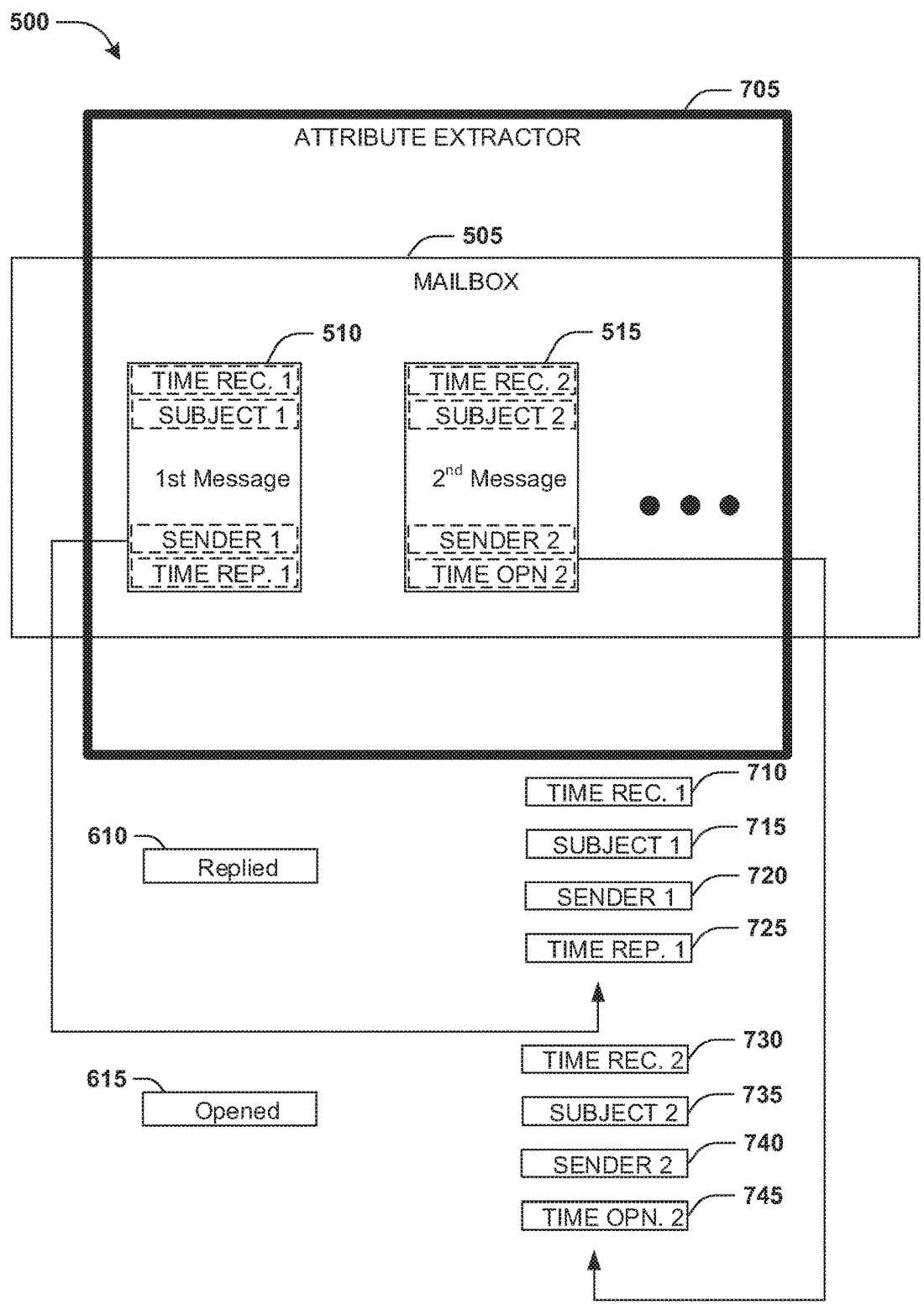
FIG. 7 is a component block diagram illustrating an example system for controlling a graphical user interface using a presentation of messages based upon predicted interactions with the messages.

As illustrated in FIG. 7, the system 500 may include an attribute extractor 705, which may be configured to analyze messages in the mailbox 505 and identify and/or extract attributes for each message in the mailbox 505. The attribute extractor 705 may analyze the first message 510 to determine that the first message 510 was received at a first time, has a first subject, was sent by a first sender, and/or was replied to at a first reply time. The attribute extractor 705 may generate a first attribute 710 indicating the first time, a second attribute 715 indicating the first subject, a third attribute 720 indicating the first sender and/or a fourth attribute 725 indicating the first reply time. The attribute extractor 705 may analyze the second message 515 to determine that the second message 515 was received at a second time, has a second subject, was sent by a second sender, and/or was opened at a second open time. The attribute extractor 705 may generate a fifth attribute 730 indicating the second time, a sixth attribute 735 indicating the second subject, a seventh attribute 740 indicating the second sender and/or an eighth attribute 745 indicating the second open time.

Figure 8:
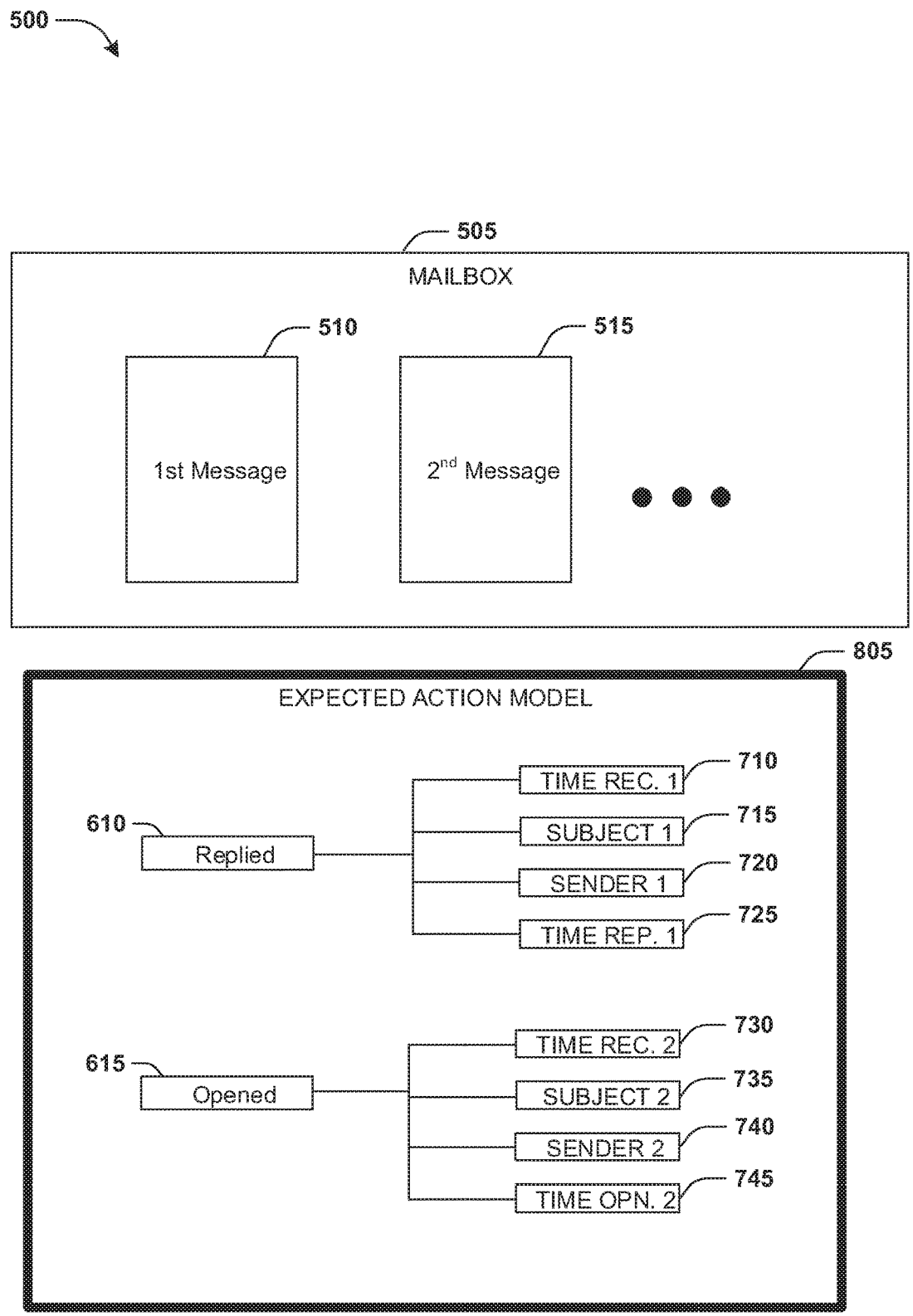
FIG. 8 is a component block diagram illustrating an example system for controlling a graphical user interface using a presentation of messages based upon predicted interactions with the messages.

As illustrated in FIG. 8, the system 500 may use one or more of the interactions generated by the interaction tracker 605 and/or the attributes extracted and/or generated by the attribute extractor 705 to generate an expected action model 805. The expected action model 805 may indicate one or more connections, relationships, correlations, etc. between one or more interactions and/or one or more attributes of messages of the mailbox 505.

For example, the expected action model 805 may indicate that a message with the first attribute 710 (e.g., the first time), the second attribute 715 (e.g., the first subject), the third attribute 720 (e.g., the first sender) may have a greater than threshold (e.g., average) probability of being interacted with based upon the first interaction 610 (e.g., being replied to) in accordance with the fourth attribute 725 (e.g., at the first reply time). Alternatively and/or additionally, the expected action model 805 may indicate that a message with the fifth attribute 730 (e.g., the second time), the sixth attribute 735 (e.g., the second subject), the third attribute 740 (e.g., the second sender) may have a greater than threshold (e.g., average) probability of being interacted with based upon the second interaction 615 (e.g., being opened) in accordance with the fourth attribute 745 (e.g., at the second open time).

Figure 9:
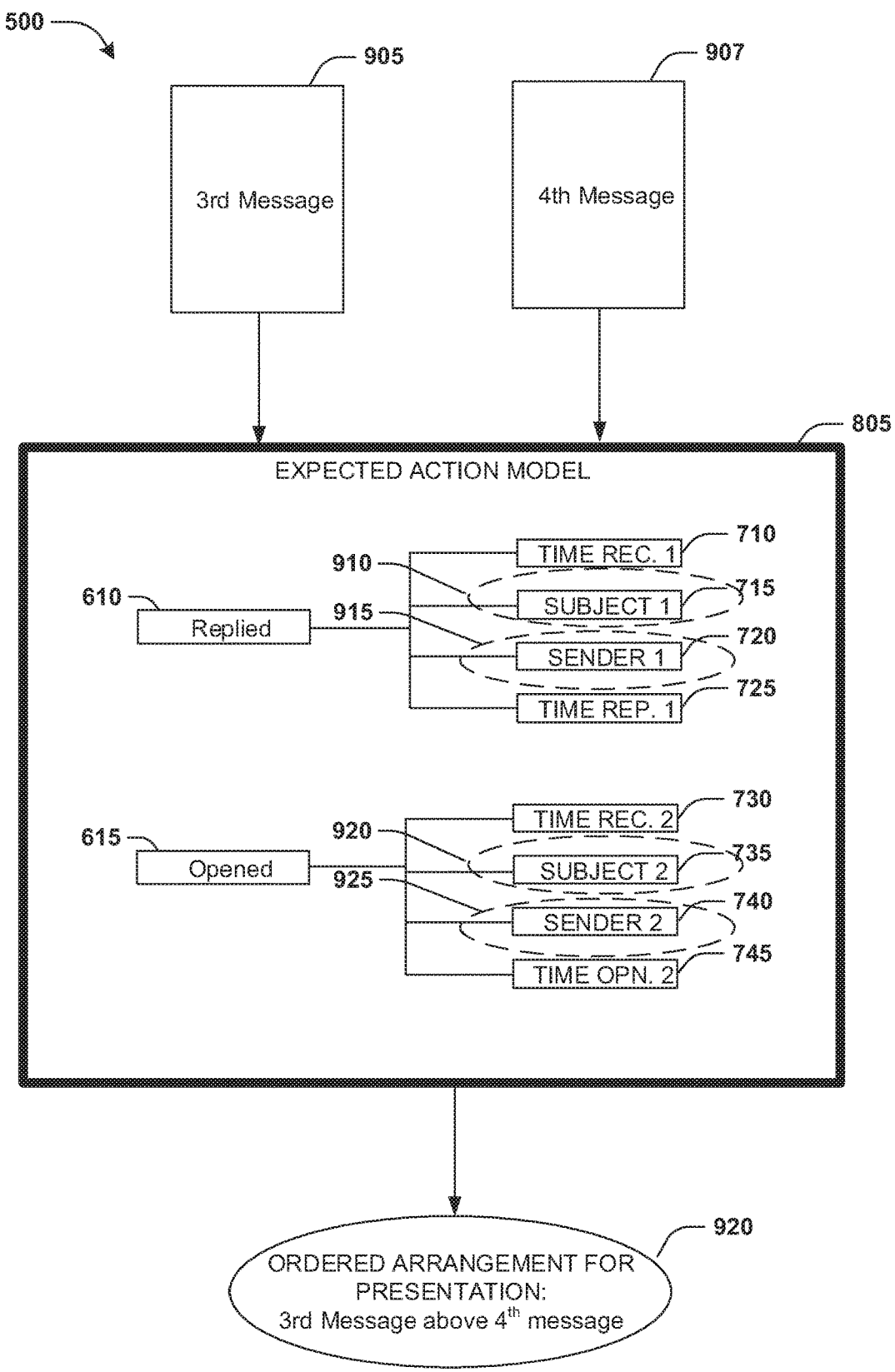
FIG. 9 is a component block diagram illustrating an example system for controlling a graphical user interface using a presentation of messages based upon predicted interactions with the messages.

As illustrated in FIG. 9, the system 500 may use the expected action model 805 to process a third message 905 and/or a fourth message 907, which may be received in the mailbox 505 (e.g., after receiving the first message 510 and the second message 515 and/or after generating the expected action model 805). For example, the system 500 may scan the third message 905 and/or compare one or more portions of the third message 905 to one or more portions of the expected action model 805 to determine whether at least some of the third message 905 matches attributes used to build the expected action model 805.

The system 500 may identify a first match 910 of an attribute shared (e.g., and/or similar within a threshold) between the third message 905 and the expected action model 805. For example, the system 500 may determine that the third message 905 has the second attribute 715 that was generated based upon the first message 510 (e.g., the third message 905 may have a same and/or similar subject as the first message 510).

The system 500 may identify a second match 915 of an attribute shared (e.g., and/or similar within a threshold) between the third message 905 and the expected action model 805. For example, the system 500 may determine that the third message 905 has the third attribute 720 that was generated based upon the first message 510 (e.g., the third message 905 may have a same and/or similar sender/origin as the first message 510).

The system 500 may analyze the third message 905 to predict one or more interactions based upon the expected action model 805. For example, based upon the first match 910 and/or the second match 915, a determination may be made that, like the first message 510, the third message 905 is likely to be interacted with based upon the first interaction 610 (e.g., being replied to) in accordance with the fourth attribute 725 (e.g., at the first reply time).

The system 500 may identify a third match 920 of an attribute shared (e.g., and/or similar within a threshold) between the fourth message 907 and the expected action model 805. For example, the system 500 may determine that the fourth message 907 has the sixth attribute 735 that was generated based upon the second message 515 (e.g., the fourth message 907 may have a same and/or similar subject as the second message 515).

The system 500 may identify a fourth match 925 of an attribute shared (e.g., and/or similar within a threshold) between the fourth message 907 and the expected action model 805. For example, the system 500 may determine that the fourth message 907 has the seventh attribute 740 that was generated based upon the second message 515 (e.g., the fourth message 907 may have a same and/or similar sender/origin as the second message 515).

The system 500 may analyze the fourth message 907 to predict one or more interactions based upon the expected action model 805. For example, based upon the third match 920 and/or the fourth match 925, a determination may be made that, like the second message 515, the fourth message 907 is likely to be interacted with based upon the second interaction 615 (e.g., being opened) in accordance with the eighth attribute 745 (e.g., at the second open time).

The prediction of the interaction with the third message 905 and/or the interaction with the fourth message 907 and/or the times may be made based upon a determination that a threshold number of attributes (e.g., two or more) match the third message 905 and/or the fourth message 907, based upon a determination that a level of similarity between the matches exceeds a threshold (e.g., the subjects are at least 60% the same in content and/or related in topic), based upon a determination that the number of attributes of the interaction and/or the time matching the third message 905 and/or the fourth message 907 exceed the number of attributes of the number of attributes of one or more other interactions and/or the times matching the third message 905 and/or the fourth message 907, etc. In some examples, the prediction for performance of interactions and/or the time may be calculated based upon a combination of a plurality of attributes and/or interactions associated with (e.g., extracted from) a plurality of different messages. For example, if the third message 905 is determined to have a subject and a sender matching those of five previously processed messages, the third message may be predicted to perform the interaction by a time that is an average of the times associated with the five previously processed messages.

The system 500 may generate a presentation 920 (e.g., and/or generate a plurality of presentations and select the presentation 920 from amongst the plurality of presentations) based upon the predicted interaction and/or the times. The presentation 920 may include an ordered arrangement for presenting the third message 905 and/or the fourth message 907 (e.g., for a particular context).

As illustrated in FIG. 10, the system 500 may control a graphical user interface 1005 visually representing (e.g., an index of) at least some messages in the mailbox 505. The graphical user interface 1005 may graphically present an inbox or other portion of the messaging account, for example. The graphical user interface 1005 may display the messages organized based upon various attributes of the messages, such as a sender attribute 1010, a subject attribute 1015 and/or a date received attribute 1020.

Figure 11:
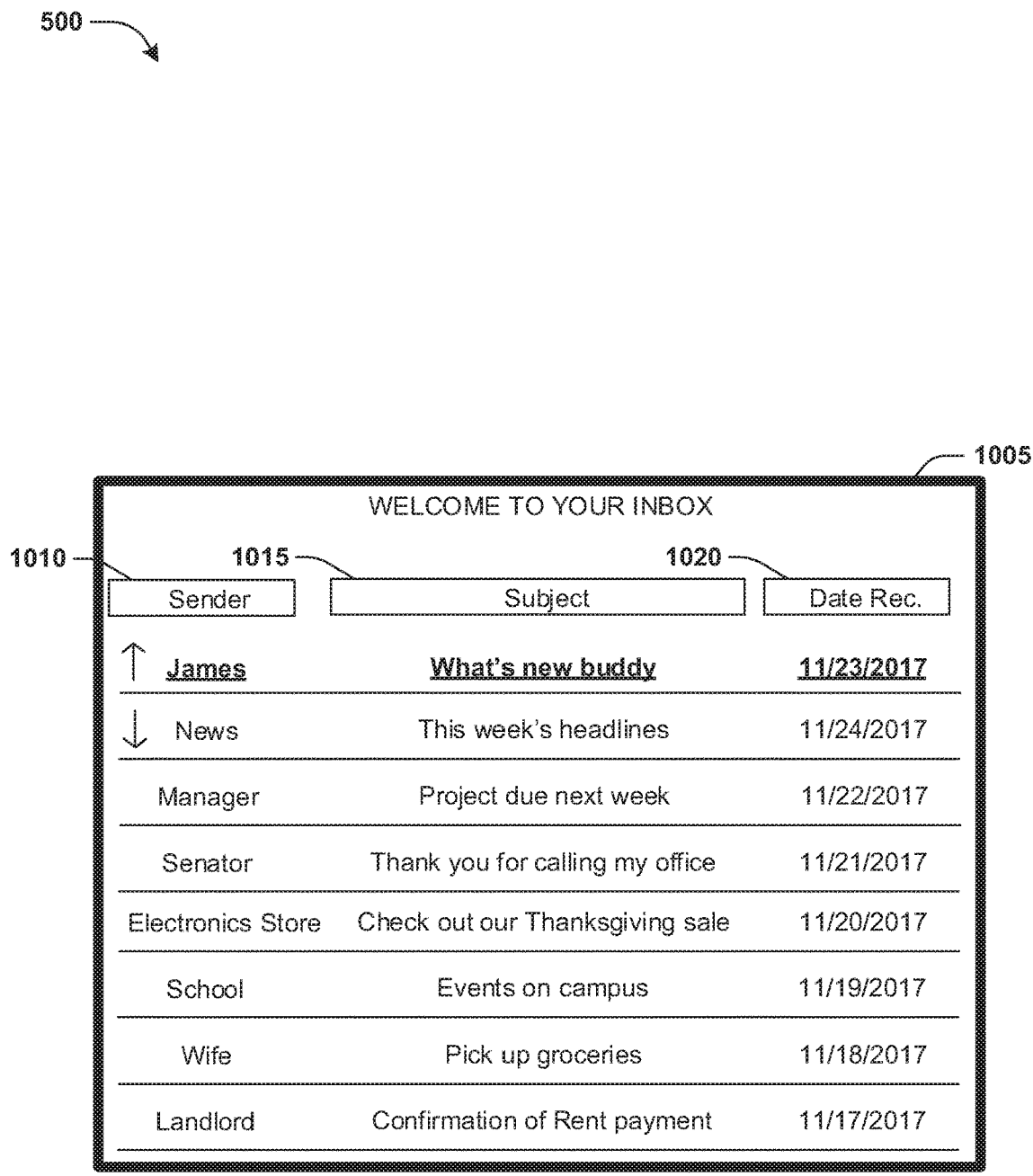
FIG. 11 is a component block diagram illustrating an example system for controlling a graphical user interface using a presentation of messages based upon predicted interactions with the messages.

As illustrated in FIG. 11, the system 500 may control the graphical user interface 1005 based upon the presentation 920. For example, the graphical user interface 1005 may visually implement the ordered arrangement of the presentation 920 to modify an ordering and/or arrangement of at least some messages in the mailbox 505 (e.g., when the time is reached, or is within a threshold amount of time from being reached). Based upon the presentation 920, the messages in the graphical user interface 1005 may be reordered such that the third message 905 is displayed in a first position and/or above one or more other messages, such as the fourth message 907, which may have been received after the third message 905 and/or may be displayed in a second position. In some examples, the graphical user interface 1005 may highlight (e.g., via modifying the order, bolding, underling, coloring, animation, arrow icon or other icon, etc.) the representation of the third message 905 such that the third message 905 is visually distinguished from one or more other messages represented in the graphical user interface 1005.

In some examples, the graphical user interface 1005 may be controlled to display a graphical object indicative of an interface configured to enable performance of the interaction predicted for the third message 905 and/or the fourth message 907. For example, if the interaction predicted is to reply or forward, the graphical object may include an interface for writing and sending a reply or forward message. One or more fields of the drafted message may be automatically populated in the interface by the system 500. For example, the recipient field, the subject field and/or the body field of the drafted message may be predicted and populated based upon the attributes derived from the expected action model 805. The interface may be usable by the user to edit one or more of the fields, and then transmit the drafted message upon selection of a send input.

Figure 12:
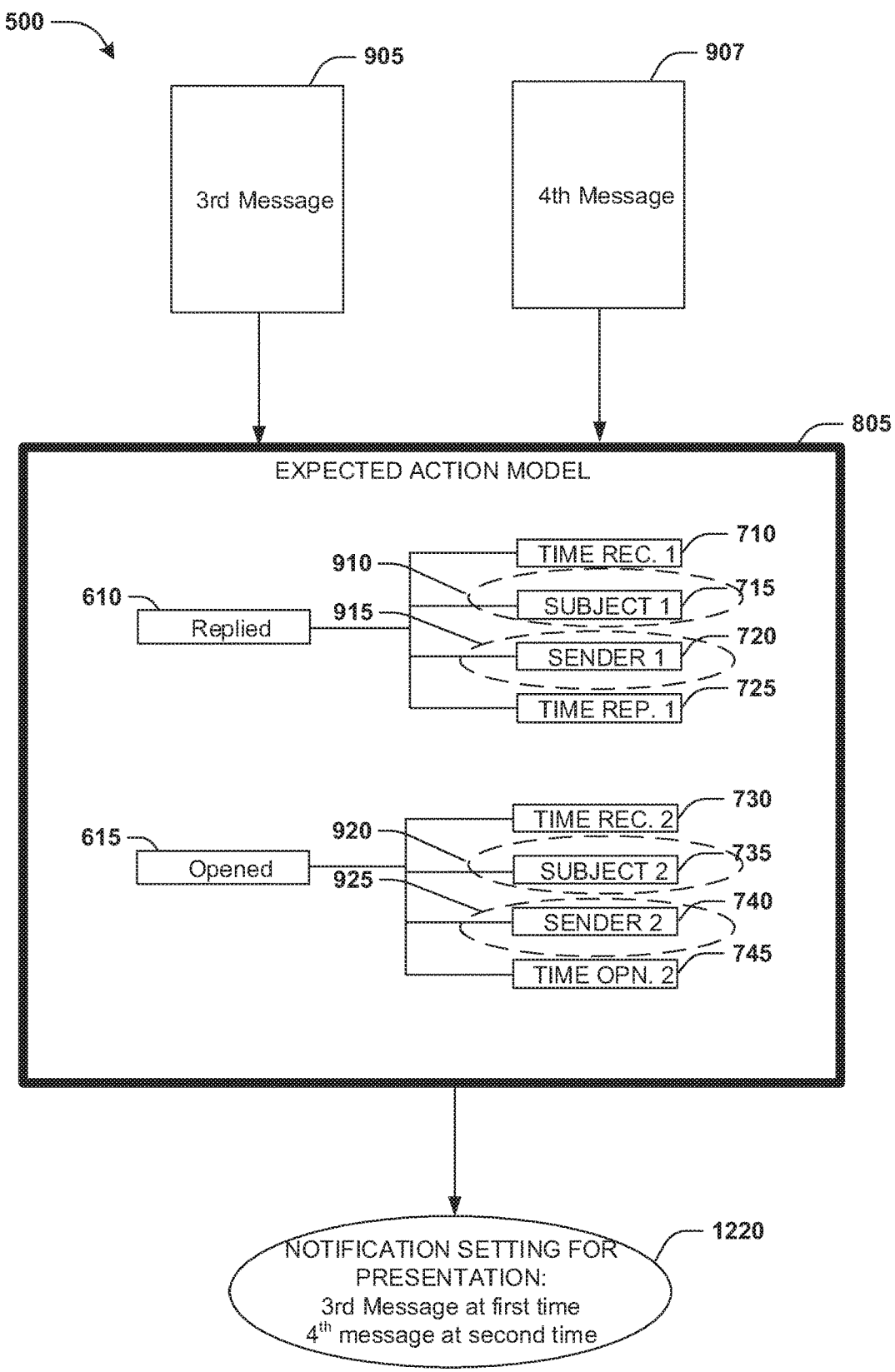
FIG. 12 is a component block diagram illustrating an example system for controlling a graphical user interface using a presentation of messages based upon predicted interactions with the messages.

As illustrated in FIG. 12, upon predicting the interaction with the third message 905 and/or the interaction with the fourth message 907 and/or the times (e.g., after performing the matching described above with regards to FIG. 9), the system 500 may generate a presentation 1220 (e.g., and/or generate a plurality of presentations and select the presentation 1220 from amongst the plurality of presentations) based upon the predicted interaction and/or the times. The presentation 1220 may include a notification setting for presenting and/or displaying notifications for the third message 905 and/or the fourth message 907 (e.g., for a particular context). The presentation 1220 may include instructions for displaying a notification for the third message 905 at a first time and/or after a first delay. The presentation 1220 may not include instructions for (e.g., or may include instructions to avoid) displaying a notification for the fourth message 907 at the first time and/or after the first delay and/or may include instructions for displaying a notification for the fourth message 907 at a second time and/or after a second delay.

Figure 13:
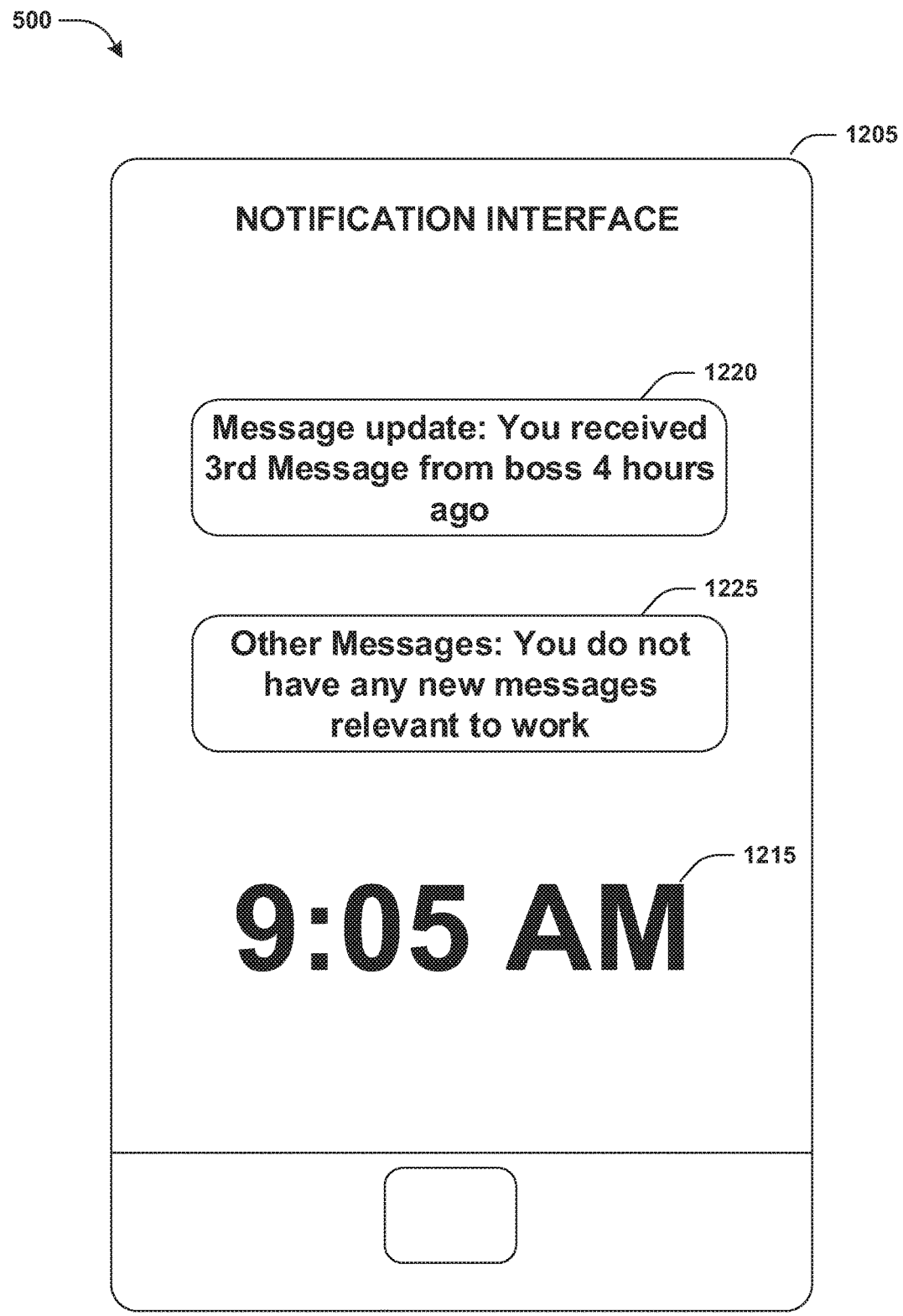
FIG. 13 is a component block diagram illustrating an example system for controlling a graphical user interface using a presentation of messages based upon predicted interactions with the messages.

As illustrated in FIG. 13, the system 500 may control a second graphical user interface 1205 based upon the presentation 1220. For example, the second graphical user interface 1205 may visually display the presentation 1220 (e.g., on a screen of the client device) including the notification for the third message 905 and/or without displaying a notification for the fourth message 907 (e.g., when the time is reached, or is within a threshold amount of time from being reached). The second graphical user interface 1205 may display a notification 1225 that one or more other messages (e.g., the fourth message 907) associated with the messaging account are not currently relevant (e.g., responsive to determining that the one or more other messages are not predicted to be interacted with in the context and/or at the time). The second graphical user interface 1205 may display context information 1215, such as an instant time, an instant location, an instant time zone, an instant setting, etc.

In some examples, where time and/or time thresholds are described herein, the time and/or time threshold may correspond to an instant of time, a range in time (e.g., minutes and/or hours in a day, days in a week, weeks in a month, months in a year, seasons, etc.), etc.

In some example, at least some of the disclosed subject matter may be implemented by an operating system-level service that tracks events across a plurality of applications and/or services and generates and/r implements presentations and/or notifications for the plurality of applications and/or services.

In some examples, at least some of the disclosed subject matter may be implemented on a client device, and in some examples, at least some of the disclosed subject matter may be implemented on a server (e.g., hosting a service accessible via a network, such as the Internet). For example, the client device may download one or more (e.g., and/or all) messages of the messaging account from the server, generate the expected action model using the downloaded messages and/or interactions, and perform predictions and generate corresponding presentations. Alternatively and/or additionally, the server may generate the expected action model, monitor interactions and perform predictions and transmit corresponding presentations to the client device. Alternatively and/or additionally, the expected action model may be generated on the server and then pushed to the client device for use in making predictions and generating corresponding presentations and/or for further updating based upon newly received messages.

In some examples, at least some of the disclosed subject matter that is discussed as being displayed and/or received via a graphical user interface may alternatively and/or additionally be presented and/or received as audio (e.g., via a speaker and/or microphone of the client device). For example, interactions may be received as audio input via a microphone and/or reminders may be presented as audio output via a speaker.

Implementation of at least some of the disclosed subject matter may lead to benefits including, but not limited to, a reduction in screen space and/or an improved usability of a display (e.g., of a client device). Alternatively and/or additionally, implementation of at least some of the disclosed subject matter may lead to benefits including a reduction in processing and/or power consumption (e.g., as a result of the user spending less time viewing, determining the significance of and/or acting upon the plurality of messages, as a result of a reduction of transmission and/or reception of data, as a result of not requiring a user to manually identify messages relevant to a context with low levels of accuracy, etc.). Alternatively and/or additionally, implementation of at least some of the disclosed subject matter may lead to benefits including a reduction in bandwidth (e.g., as a result of performing one or more interactions when needed without a need to repeatedly access various messages to ensure that all interactions are performed).

Figure 14:
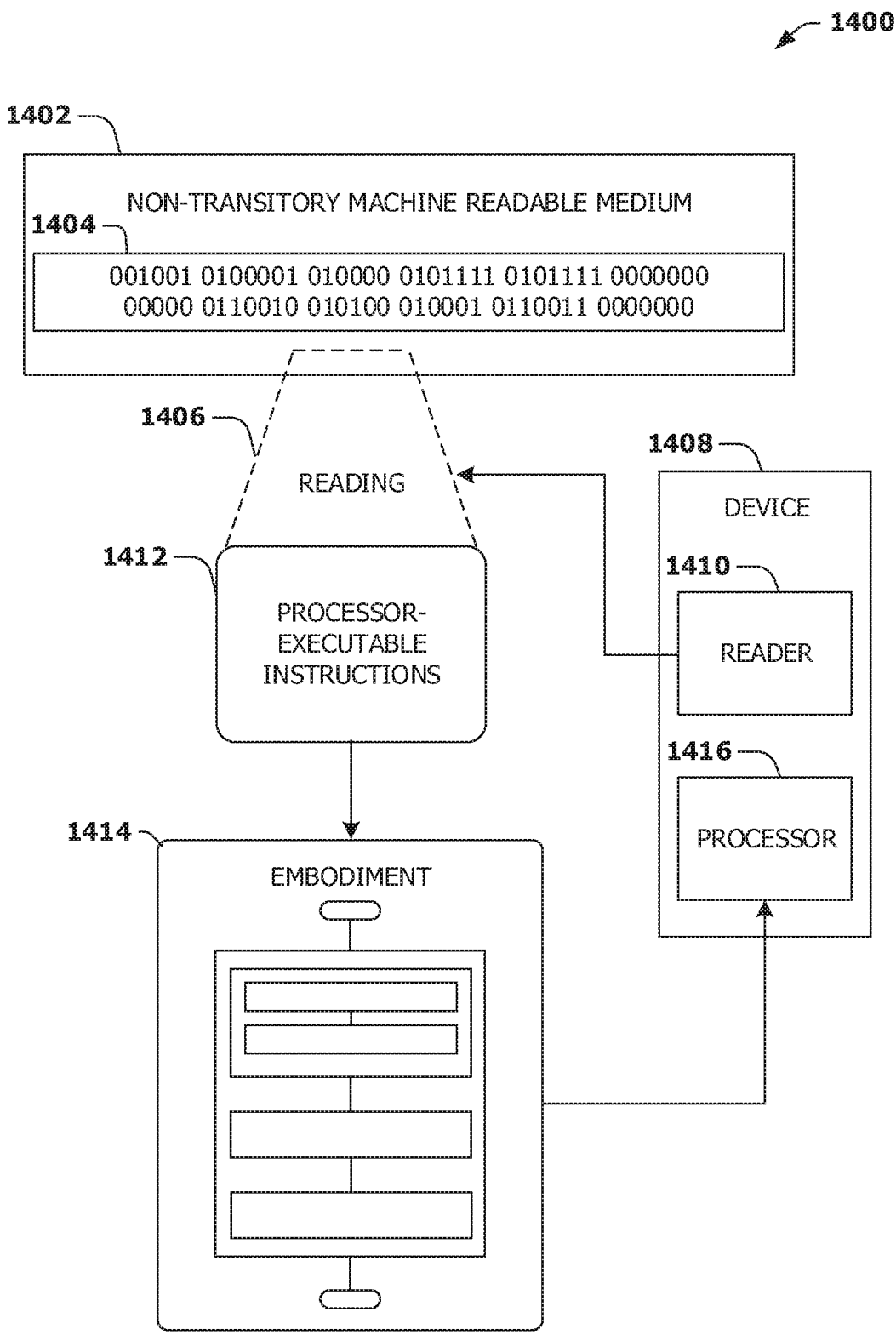
FIG. 14 is an illustration of a scenario featuring an example non-transitory machine readable medium in accordance with one or more of the provisions set forth herein.

FIG. 14 is an illustration of a scenario 1400 involving an example non-transitory machine readable medium 1402. The non-transitory machine readable medium 1402 may comprise processor-executable instructions 1412 that when executed by a processor 1416 cause performance (e.g., by the processor 1416) of at least some of the provisions herein (e.g., embodiment 1414). The non-transitory machine readable medium 1402 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 1402 stores computer-readable data 1404 that, when subjected to reading 1406 by a reader 1410 of a device 1408 (e.g., a read head of a hard disk drive, or a read operation invoked on a solid-state storage device), express the processor-executable instructions 1412. In some embodiments, the processor-executable instructions 1412, when executed, cause performance of operations, such as at least some of the example method 400 of FIG. 4, for example. In some embodiments, the processor-executable instructions 1412 are configured to cause implementation of a system, such as at least some of the example system 500 of FIGS. 5-13, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving a plurality of messages, associated with a messaging account, comprising a first message and a second message;
tracking interactions with the plurality of messages to generate a first set of message interactions for the first message and a second set of message interactions for the second message;
analyzing the plurality of messages to identify a first set of attributes for the first message and a second set of attributes for the second message;
generating an expected action model, customized for the messaging account, based upon a combination of at least three expectation models determined to be applicable to the messaging account including:
(i) a user-specific expectation model generated for the messaging account using the first set of message interactions, the second set of message interactions, the first set of attributes and the second set of attributes;
(ii) a company-specific subset expectation model generated for a subset of user accounts associated with a company based upon a subset of message interactions associated with the company, wherein a user of the messaging account is associated with the company, wherein the subset of message interactions comprise message interactions of a second user of a second messaging account based upon the second user being associated with the company but wherein the subset of message interactions do not comprise message interactions of a third user of a third messaging account based upon the third user not being associated with the company; and
(iii) a global expectation model generated for a plurality of user accounts based upon a set of message interactions associated with at least some user accounts of the plurality of user accounts, wherein the set of message interactions comprise the message interactions of the second user of the second messaging account and the message interactions of the third user of the third messaging account of the plurality of user accounts not included in the subset of message interactions used to generate the company-specific subset expectation model;
analyzing a set of messages, comprising a third message and a fourth message, associated with the messaging account based upon the expected action model that was generated based upon the user-specific expectation model, the company-specific subset expectation model and the global expectation model;
based upon the analyzing the set of messages, predicting one or more interactions, associated with one or more contexts, corresponding to a plurality of potential presentations of the set of messages comprising the third message and the fourth message, wherein the one or more interactions comprise (i) one or more first predicted interactions corresponding to a first potential presentation of the set of messages comprising the third message and the fourth message in a first context of a client device accessing the messaging account and (ii) one or more second predicted interactions corresponding to a second potential presentation of the set of messages comprising the third message and the fourth message in the first context of the client device accessing the messaging account;
based upon a current context of the client device accessing the messaging account and an evaluation of both the first potential presentation of the set of messages in the first context and the second potential presentation of the set of messages in the first context, selecting a presentation from the plurality of potential presentations, of the set of messages, comprising the first potential presentation of the set of messages and the second potential presentation of the set of messages, wherein the selecting the presentation is based upon a determination that the presentation is associated with at least one of a higher level of interaction or a higher proportion of messages interacted with than one or more other presentations in the plurality of potential presentations;
responsive to selecting the presentation from the plurality of potential presentations:
generating, based upon at least one of one or more message notification times or one or more message delivery times associated with the selected presentation, a feedback message comprising instructions to modify one or more rules associated with future message delivery times; and
transmitting the feedback message to a sender of at least one of the third message or the first message; and
controlling a graphical user interface of the client device using the presentation.

2. The method of claim 1, wherein:
the plurality of potential presentations correspond to one or more potential ordered arrangements of the set of messages;
the presentation corresponds to an ordered arrangement, of the set of messages, associating each message of the set of messages with a position; and
the controlling the graphical user interface comprises:
presenting a fifth message of the set of messages in a first position in accordance with the ordered arrangement; and
presenting a sixth message of the set of messages in a second position below the first position in accordance with the ordered arrangement.

3. The method of claim 1, wherein the controlling the graphical user interface using the presentation comprises:
displaying, in the graphical user interface, a list of four or more selectable messages; and
responsive to determining that one selectable message of the selectable messages is associated with a higher relevance than three or more other selectable messages of the other selectable messages, visually distinguishing the one selectable message from the three or more other selectable messages by modifying at least one of a font, a size or formatting associated with the one selectable message.

4. The method of claim 1, wherein:
the plurality of potential presentations correspond to one or more potential notification settings for the set of messages;
the presentation corresponds to a notification setting, for the set of messages, associating each message of the set of messages with a notification time; and
the controlling the graphical user interface comprises:
presenting a notification for a fifth message of the set of messages at a first notification time in accordance with the notification setting; and
presenting a notification for a sixth message of the set of messages at a second notification time in accordance with the notification setting.

5. The method of claim 1, wherein:
the predicting comprises predicting one or more interactions with a first bundle of messages of the set of messages by a first time threshold;
the selecting is performed responsive to determining that the first bundle of messages have not been interacted with by the first time threshold; and
the controlling the graphical user interface comprises:
presenting a notification for the first bundle of messages.

6. The method of claim 1, wherein:
the plurality of potential presentations correspond to one or more potential delivery settings for the set of messages;
the presentation corresponds to a delivery setting, for the set of messages, associating each message of the set of messages with a delivery time; and
the method comprises:
delaying delivery of the third message of the set of messages until a first delivery time in accordance with the delivery setting; and
delaying delivery of the fourth message of the set of messages until a second delivery time in accordance with the delivery setting.

7. The method of claim 6, wherein the third message is delivered to a mailbox of the messaging account at the first delivery time.

8. The method of claim 7, wherein concurrently with the delaying delivery of the third message, the third message is delivered to a secondary mailbox of the messaging account prior to the first delivery time.

9. The method of claim 1, comprising:
analyzing the set of messages based upon the expected action model to predict one or more other interactions, associated with one or more other contexts, corresponding to two or more potential presentations of the set of messages, wherein the one or more other interactions comprise (i) one or more third predicted interactions corresponding to a third potential presentation of the set of messages in a second context of the client device accessing the messaging account and (ii) one or more fourth predicted interactions corresponding to a fourth potential presentation of the set of messages in the second context of the client device accessing the messaging account;
based upon an updated context of the client device accessing the messaging account and an evaluation of the two or more potential presentations of the set of messages, selecting an updated presentation from the two or more potential presentations, wherein the selecting the updated presentation is based upon a determination that the updated presentation is associated with at least one of a higher level of interaction or a higher proportion of messages interacted with than one or more other presentations in the two or more potential presentations; and
controlling the graphical user interface of the client device using the updated presentation.

10. The method of claim 1, wherein:
the interactions comprise at least one of opening of a message, a replying to a message or a forwarding of a message; and
attributes of at least one of the first set of attributes or the second set of attributes comprise at least one of a sender of a message, a subject of a message, a body of a message, a time of an interaction with a message, a time of receipt of a message or a domain associated with a message.

11. A computing device, comprising:
a processor; and
memory comprising processor-executable instructions that when executed by the processor cause performance of operations, the operations comprising:
receiving a plurality of messages, associated with a messaging account, comprising a first message and a second message;
at least one of:
tracking interactions with the plurality of messages to generate a first set of message interactions for the first message and a second set of message interactions for the second message; or
analyzing the plurality of messages to identify a first set of attributes for the first message and a second set of attributes for the second message;
generating an expected action model, customized for the messaging account, based upon a combination of at least three expectation models determined to be applicable to the messaging account including:
(i) a user-specific expectation model generated for the messaging account using at least one of:
the first set of message interactions and the second set of message interactions; or
the first set of attributes and the second set of attributes;
(ii) a company-specific subset expectation model generated for a subset of user accounts associated with the subset of user accounts based upon a subset of message interactions associated with the subset of user accounts, wherein a user of the messaging account is associated with the subset of user accounts, wherein the subset of message interactions comprise message interactions of a second user of a second messaging account based upon the second user being associated with the subset of user accounts but wherein the subset of message interactions do not comprise message interactions of a third user of a third messaging account based upon the third user not being associated with the subset of user accounts; and
(iii) a global expectation model generated for a plurality of user accounts based upon a set of message interactions associated with at least some user accounts of the plurality of user accounts, wherein the set of message interactions comprise the message interactions of the second user of the second messaging account and the message interactions of the third user of the third messaging account of the plurality of user accounts not included in the subset of message interactions used to generate the company-specific subset expectation model;

analyzing a set of messages, comprising a third message and a fourth message, associated with the messaging account based upon the expected action model that was generated based upon the user-specific expectation model, the company-specific subset expectation model and the global expectation model;

based upon the analyzing the set of messages, predicting one or more interactions, associated with one or more contexts, corresponding to a plurality of potential presentations of the set of messages comprising the third message and the fourth message, wherein the one or more interactions comprise (i) one or more first predicted interactions corresponding to a first potential presentation of the set of messages comprising the third message and the fourth message in a first context of a client device accessing the messaging account and (ii) one or more second predicted interactions corresponding to a second potential presentation of the set of messages comprising the third message and the fourth message in the first context of the client device accessing the messaging account;

based upon a current context of the client device accessing the messaging account and an evaluation of both the first potential presentation of the set of messages in the first context and the second potential presentation of the set of messages in the first context, selecting a presentation from the plurality of potential presentations, of the set of messages, comprising the first potential presentation of the set of messages and the second potential presentation of the set of messages; and responsive to selecting the presentation from the plurality of potential presentations:
generating, based upon at least one of one or more message notification times or one or more message delivery times associated with the selected presentation, a feedback message comprising instructions to modify one or more rules associated with future message delivery times; and
transmitting the feedback message to a sender of at least one of the third message or the first message.

12. The computing device of claim 11, wherein:
the plurality of potential presentations correspond to one or more potential ordered arrangements of the set of messages;
the presentation corresponds to an ordered arrangement, of the set of messages, associating each message of the set of messages with a position; and
the operations comprise:
presenting a fifth message of the set of messages in a first position in accordance with the ordered arrangement; and
presenting a sixth message of the set of messages in a second position below the first position in accordance with the ordered arrangement.

13. The computing device of claim 11, wherein:
the plurality of potential presentations correspond to one or more potential notification settings for the set of messages;
the presentation corresponds to a notification setting, for the set of messages, associating each message of the set of messages with a notification time; and
the operations comprise:

presenting a notification for a fifth message of the set of messages at a first notification time in accordance with the notification setting; and
presenting a notification for a sixth message of the set of messages at a second notification time in accordance with the notification setting.

14. The computing device of claim 11, wherein:
the predicting comprises predicting one or more interactions with a first bundle of messages of the set of messages by a first time threshold;
the selecting is performed responsive to determining that the first bundle of messages have not been interacted with by the first time threshold; and
the operations comprise:
presenting a notification for the first bundle of messages.

15. The computing device of claim 11, wherein:
the plurality of potential presentations correspond to one or more potential delivery settings for the set of messages;
the presentation corresponds to a delivery setting, for the set of messages, associating each message of the set of messages with a delivery time; and
the operations comprise:
delaying delivery of the third message of the set of messages until a first delivery time in accordance with the delivery setting; and
delaying delivery of the fourth message of the set of messages until a second delivery time in accordance with the delivery setting.

16. A non-transitory machine readable medium having stored thereon processor-executable instructions that when executed cause performance of operations, the operations comprising:
accessing an expected action model, customized for a messaging account, indicative of associations between one or more message interactions and one or more message attributes, wherein the expected action model is based upon a combination of at least two expectation models determined to be applicable to the messaging account including at least two of:
(i) a user-specific expectation model generated for the messaging account using the one or more message interactions and the one or more message attributes;
(ii) a company-specific subset expectation model generated for a subset of user accounts based upon a subset of message interactions associated with the subset of user accounts, wherein a user of the messaging account is associated with the subset of user accounts, wherein the subset of message interactions comprise message interactions of a second user of a second messaging account based upon the second user being associated with the subset of user accounts but wherein the subset of message interactions do not comprise message interactions of a third user of a third messaging account based upon the third user not being associated with the subset of user accounts; or
(iii) a global expectation model generated for a plurality of user accounts based upon a set of message interactions associated with at least some user accounts of the plurality of user accounts, wherein the set of message interactions comprise the message interactions of the second user of the second messaging account and the message interactions of the third user of the third messaging account of the plurality of user accounts not included in the subset of message interactions used to generate the company-specific subset expectation model;

analyzing a set of messages, comprising a first message and a second message, associated with the messaging account based upon the expected action model that was generated based upon at least two of the user-specific expectation model, the company-specific subset expectation model or the global expectation model;

based upon the analyzing the set of messages, predicting one or more interactions corresponding to a plurality of potential presentations of the set of messages comprising the first message and the second message, wherein the one or more interactions comprise (i) one or more first predicted interactions corresponding to a first potential presentation of the set of messages comprising the first message and the second message in a first context of a client device accessing the messaging account and (ii) one or more second predicted interactions corresponding to a second potential presentation of the set of messages comprising the first message and the second message in the first context of the client device accessing the messaging account;

based upon an evaluation of both the first potential presentation of the set of messages and the second potential presentation of the set of messages, selecting a presentation from the plurality of potential presentations, of the set of messages, comprising the first potential presentation of the set of messages in the first context and the second potential presentation of the set of messages in the first context; and responsive to selecting the presentation from the plurality of potential presentations:
- generating, based upon at least one of one or more message notification times or one or more message delivery times associated with the selected presentation, a feedback message comprising instructions to modify one or more rules associated with future message delivery times; and
- transmitting the feedback message to a sender of at least one of the second message or the first message.

17. The non-transitory machine readable medium of claim 16, wherein:
the plurality of potential presentations correspond to one or more potential ordered arrangements of the set of messages;
the presentation corresponds to an ordered arrangement, of the set of messages, associating each message of the set of messages with a position; and
the operations comprise:
- presenting a third message of the set of messages in a first position in accordance with the ordered arrangement; and
- presenting a fourth message of the set of messages in a second position below the first position in accordance with the ordered arrangement.

18. The non-transitory machine readable medium of claim 16, wherein:
the plurality of potential presentations correspond to one or more potential notification settings for the set of messages;
the presentation corresponds to a notification setting, for the set of messages, associating each message of the set of messages with a notification time; and
the operations comprise:
- presenting a notification for a third message of the set of messages at a first notification time in accordance with the notification setting; and
- presenting a notification for a fourth message of the set of messages at a second notification time in accordance with the notification setting.

19. The non-transitory machine readable medium of claim 16, wherein:
the predicting comprises predicting one or more interactions with a first bundle of messages of the set of messages by a first time threshold;
the selecting is performed responsive to determining that the first bundle of messages have not been interacted with by the first time threshold; and
the operations comprise:
- presenting a notification for the first bundle of messages.

20. The non-transitory machine readable medium of claim 16, wherein:
the plurality of potential presentations correspond to one or more potential delivery settings for the set of messages;
the presentation corresponds to a delivery setting, for the set of messages, associating each message of the set of messages with a delivery time; and
the operations comprise:
- delaying delivery of a third message of the set of messages until a first delivery time in accordance with the delivery setting; and
- delaying delivery of a fourth message of the set of messages until a second delivery time in accordance with the delivery setting.

* * * * *